United States Patent
Wihardja et al.

(10) Patent No.: US 10,511,939 B1
(45) Date of Patent: Dec. 17, 2019

(54) METHODS, SYSTEMS AND DEVICES FOR COMMUNICATING BETWEEN DEVICES WITHIN A CHANNEL HOPPING SYSTEM

(71) Applicant: Cypress Semiconductor Corporation, San Jose, CA (US)

(72) Inventors: Walter James Wihardja, Tustin, CA (US); Victor Simileysky, San Jose, CA (US); Victor Zhodzishsky, Potomac, MD (US); Thaiyalan Appadurai, Lake Forest, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/137,184

(22) Filed: Sep. 20, 2018

(51) Int. Cl.
| | |
|---|---|
| H04W 4/00 | (2018.01) |
| H04W 4/029 | (2018.01) |
| H04L 27/10 | (2006.01) |
| H04W 4/80 | (2018.01) |
| H04B 1/713 | (2011.01) |

(52) U.S. Cl.
CPC ............ *H04W 4/029* (2018.02); *H04B 1/713* (2013.01); *H04L 27/10* (2013.01); *H04W 4/80* (2018.02)

(58) Field of Classification Search
CPC .................................................... H04W 4/029
See application file for complete search history.

(56) References Cited

U.S. PATENT DOCUMENTS

| | | | | |
|---|---|---|---|---|
| 6,292,494 B1* | 9/2001 | Baker | ................... | H04B 1/713 370/459 |
| 2004/0218663 A1* | 11/2004 | Lindenmeier | ......... | H04B 1/406 375/131 |
| 2017/0295558 A1* | 10/2017 | Amizur | ................... | G01S 5/021 |
| 2018/0160394 A1* | 6/2018 | Reunamaki | ............... | G01S 3/14 |
| 2018/0375703 A1* | 12/2018 | Kellogg | ................. | G01S 13/82 |

OTHER PUBLICATIONS

International Search Report for International Application No. PCT/US19/48850 dated Sep. 27, 2019; 2 pages.
Written Opinion for the International Searching Authority for International Application No. PCT/US19/48850 dated Sep. 27, 2019; 5 pages.

* cited by examiner

*Primary Examiner* — John D Blanton (57) ABSTRACT

A method can include, by operation of a first device, generating sequence information for a plurality of sequential transmission windows, the sequence information including at least a channel identification (ID) corresponding to a base frequency for each window; generating payload data for a packet and wirelessly transmitting the packet in one of the windows, the payload data including sequence information for a window later in the sequence than the window in which the packet is transmitted. By operation of an application executed on a second device, a target packet can be composed that includes inverse whitened data; wherein the whitening of the inverse whitened data by the second device results in a substantially sinusoidal signal when the target packet is transmitted. The first device can determine a direction of the second device by processing the substantially sinusoidal signal. Devices for executing such a method are also disclosed.

19 Claims, 9 Drawing Sheets

FIG. 13
(BACKGROUND)

METHODS, SYSTEMS AND DEVICES FOR COMMUNICATING BETWEEN DEVICES WITHIN A CHANNEL HOPPING SYSTEM

TECHNICAL FIELD

The present disclosure relates generally to wireless communication systems, and more particularly to wireless communication systems that rely on a predetermined channel hopping sequence.

BACKGROUND

Conventionally, systems that use channel hopping protocols, including the Bluetooth/Bluetooth Low Energy (BT/BLE) protocols, involve devices (e.g., a Master and one or more Slaves) executing a same channel hopping sequence. This enables the devices to know which base frequency will be used in a given time period (i.e., window) to transmit and receive data. Channel hopping protocols can contribute to security and signal robustness.

Among numerous applications that can be provided by a system is direction finding. Some direction finding methods can rely a sinusoidal signal (a "constant tone") transmitted from the device to be found (i.e., located device), which can be received and processed by another device (i.e., locating device) to determine the direction of the located device with respect to the locating device. Some existing protocols demand custom hardware to accommodate location finding functions. Such custom hardware can enable a located device to generate a sinusoidal signal in response to output data (e.g., an outgoing packet) or an output command.

Figure 13:
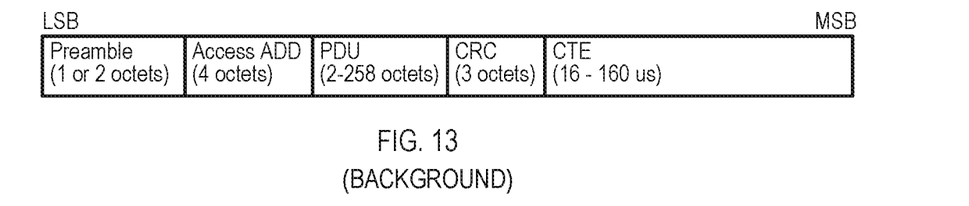
FIG. 13 is a diagram of a conventional continuous tone extension (CTE) packet used in location finding applications that requires compatible hardware.

FIG. 13 shows a conventional constant tone extension (CTE) packet that can enable the generation of a sinusoidal signal. However, the CTE packet can work only if hardware on the corresponding device can support the function. The packet includes conventional BLE packet fields, including a preamble, access address, protocol data unit (PDU), and error correction code (CRC). However, in addition it can include a constant tone extension (CTE) portion. The packet can indicate to transmitting hardware (e.g., via a particular bit setting) that it is a CTE packet. The CTE portion can be used to transmit the desired sinusoidal signal.

The above use of a CTE packet can generate the necessary signals for a direction finding application. However, as noted, the processing of a CTE packet can require custom hardware that may not be present in some devices.

DETAILED DESCRIPTION

According to embodiments, methods can include a first device (e.g., a slave device), operating according to predetermined channel hopping sequence, inserting information for a future channel in the sequence (e.g., the next upcoming channel) into packets that are transmitted. A second device (e.g., a master device) can be executing an application that does not know the channel hopping sequence but can use the future channel information to transmit information in a packet (i.e., a target packet) on the future channel. Thus, the application on the second device can transmit information to the first device without knowing the channel hopping sequence.

In some embodiments, when the second device transmits the target packet, transmission of the target packet payload can generate a substantially sinusoidal signal which can be used by the first device in a direction finding operation to locate the second device.

In some embodiments, a first device can insert sequence information into packets it transmits, and a second device can use such sequence information to generate a notice packet, which can signal to the first device when the target packet will be transmitted.

In the various embodiments below, like items are referred to by the same reference characters, but with the leading digit(s) corresponding to the figure number.

Figure 1:
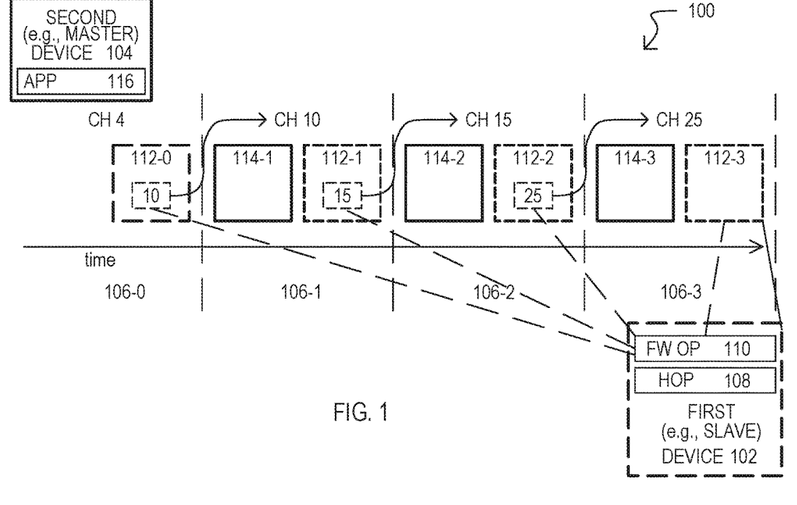
FIG. 1 is a signaling diagram of a system according to an embodiment.

Referring to FIG. 1, a system 100 according to an embodiment is shown in a signaling diagram. A system 100 can include a first device 102 and a second device 104, which can communicate by transmitting packets in windows 106-0 to -3, which are sequential in time, as shown by the "time" arrow. A base transmission frequency for each window (106-0 to -3) can change according to a sequence that is known by the first device 102, but not known by an application 116 running on the second device 104. It is understood that windows (106-0 to -3) can be of any suitable duration for a given system protocol, including variable durations and fixed durations. In some embodiments, windows (106-0 to -3) can have durations equivalent to packet length. In particular embodiments, a system can be a BT/BLE systems, and windows (106-0 to -3) can correspond to BT/BLE channels.

A base transmission frequency can be a frequency that is modulated to transmit packet data. Embodiments can include any suitable modulation methods appropriate for a given system. In some embodiments, a system 100 can utilize frequency shift keying (FSK). In particular embodiments, a system 100 can include Gaussian FSK according to a BT/BLE specification.

A first device 102 can include a hop sequencer 108 and packet processing operation 110. A hop sequencer 108 can determine information for each window (106-0 to -3). Such information can include a base transmission frequency. In the embodiment shown, base transmission frequency is represented by a channel number. Thus, in the example of FIG. 1, according to the hop sequencer 108, windows 106-0, -1, -2 and -3 will expect transmissions using base frequencies corresponding to channels CH4, CH10, CH15 and CH25, respectively. In some embodiments, a hop sequencer 108 can include a pseudorandom sequencer for generating base frequencies (e.g., channels). In particular embodiments, a hop sequencer can be hop selection scheme according to a BT/BLE specification.

A packet processing operation 110 of a first device 102 can insert data into a payload of a transmitted packet that includes information for a future window. In the embodiment shown, packet processing operation 110 can insert the channel value for a window occurring after the window in which it is being transmitted. In some embodiments, a packet processing operation 110 can be executed with firmware programmed into the first device 102, and not require any specialized hardware.

A second device 104 can be capable of transmitting and receiving packets on various channels according to a predetermined hop sequence. In some embodiments, the hop sequence can be dictated by hardware on the second device 104. The predetermined sequence may also be known by hardware on the first device 102. While hardware on a second device 104 can be aware of the hop sequence used by the first device 102, such information is not accessible by application 116. Thus, a second device 104 may receive packets transmitted by a first device 102 in a window, but application 116 does not receive any information for any future windows.

According to embodiments, an application 116 can extract data from a payload of received packets to determine sequence information (e.g., channel ID) sent by first device 102. In some embodiments, an application 116 can be computer instructions executed by the second device 104, and not require any specialized hardware, or changes to firmware in the second device 104.

In some embodiments, a system 100 can operate according to a protocol that includes master and slave devices, and a first device 102 can be a slave device, while a second device 104 can be a master device.

Referring still to FIG. 1, an operation according to an embodiment will now be described. Packets transmitted by first device 102 (and received by second device 104) are shown with dashed lines and numbered 112-$x$, where $x$ indicates a position in the sequence. Packets transmitted by second device 104 (and received by first device 102) are shown with solid lines and numbered 114-$x$.

In window 106-0, first device 102 can transmit a packet 112-0. According to packet processing operation 110, first device 102 can insert channel information for an upcoming window (e.g., a window that will be further along in the sequence) into a payload of packet 112-0. In the example shown, the channel information "10" can identify the next subsequent channel (i.e., the base frequency for use in window 106-1). Second device 104, by operation of application 116, can extract the channel information "10" from the payload of received packet 112-0. With such information, second device 104 can determine the channel for a future window (in this example shown, the next window 106-1.

In window 106-1, because application 116 has derived channel information CH 10 from received packet 112-0, it can transmit a packet 114-1, and such a packet can be received by first device 102. In the same window 106-1, first device 102 can again insert channel information (15) for an upcoming window into a payload of a packet 112-1. Again, application 116 can extract this information when it receives packet 112-1, and thereby know the channel information for an upcoming window (e.g., the next window 106-2). This process can repeat, with the first device 102 feeding future channel information to the application 116, enabling second device 104 to issue packets appropriate for a given window, and thus capable of being received by first device 102.

In some embodiments, a system 100 can be realized by (1) only changes in firmware to first device 102; (2) installation of an application on second device 104; and (3) no firmware changes to second device 104; and (4) no hardware changes to either device 102 or 104.

In some embodiments, a first device 102 can have unique hardware and/or firmware. Second device 104 can be an existing device on the market, for example a "smartphone", a smart accessory (e.g., smart watch), or any master device operating according to the protocol (e.g., BT/BLE) capable of running application 116. First device 102 could controlled or modifiable at a low-level, including changes to hardware, firmware, etc. in a fashion suitable to execute the operations described herein, and equivalents.

As will be shown in additional embodiments below, first device 102 can use data provided by a packet transmitted from second device 104 to execute various applications, including but not limited to direction finding applications.

Figure 2A:
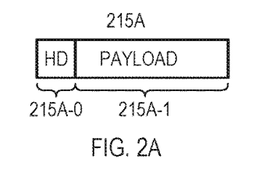
FIGS. 2A and 2B are diagrams illustrating formats for packets that can be included in embodiments.
Figure 2B:
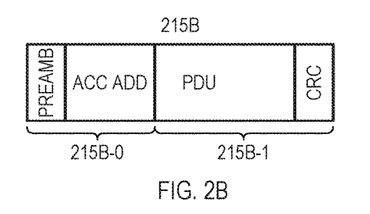

FIGS. 2A and 2B are diagrams showing examples of packets that can be included in embodiments. FIG. 2A shows a packet 215A that can include a control portion 215A-0 (e.g. header) and a data portion 215A-1 (e.g., payload). A control portion 215A-0 can include data for controlling where and/or how a packet is transmitted, while a data portion 215A-1 can include data carried by the packet for use by one or more destinations (e.g., endpoints).

FIG. 2B shows a BT/BLE type packet 215B. Packet 215B can include a control portion 215B-0, which can include a preamble (PREAMB) and access address information (ACC ADD). A data portion 215B-1 can include a protocol data unit (PDU) and error correction codes (CRC).

According to embodiments, devices can insert information into packet data portions at a predetermined location and/or in a predetermined manner so that a receiving device can extract the desired information (e.g., channel information, sequence count, etc.).

While embodiments can include systems in which one device can pass future channel information to another device, embodiments can include systems where sequence information (e.g., an event counter) can also be passed in addition to channel information. This can enable a device that does not know the hop sequence to indicate a future window in which a "target" packet (i.e., a packet including special payload data for the other device) will be transmitted. An example, of such an embodiment is shown in FIG. 3.

Figure 3:
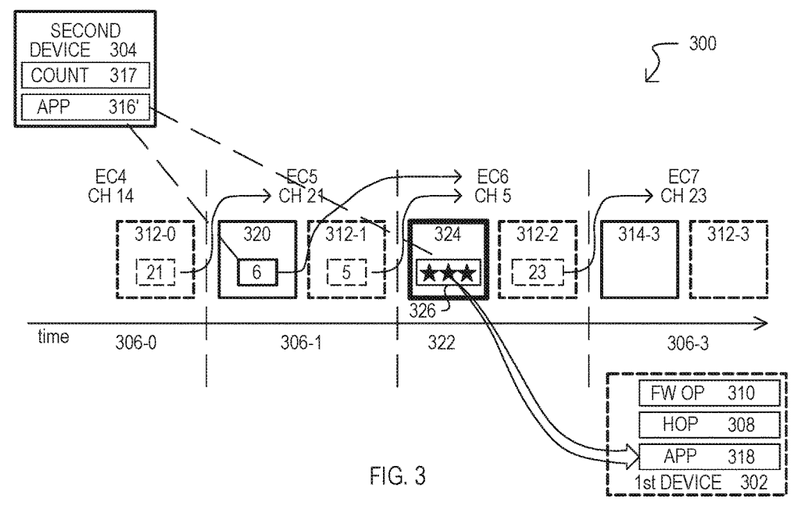
FIG. 3 is a signaling diagram of a system according to another embodiment.

FIG. 3 is a signaling diagram showing a system 300 according to another embodiment. A system 300 can include items like those shown in FIG. 1, and such items can be subject to the same variations as, or be equivalents to, such like items.

System 300 can differ from that of FIG. 1 in that both a first device 302 and a second device 304 can include an event counter (only shown in second device 317, in FIG. 3). An event counter 317 can track events between first and second devices (302, 304). This is shown in FIG. 3 by the sequential windows have event counts EC4, EC5, EC6 and EC7.

First device 302 can also include application 318. Application 318 can process information received by, or from the broadcast of, a target packet 324 transmitted in a target window 322. In one embodiment, application 318 can be a direction finding application that can use the transmission of target packet 324 to generate location data for second device 304. However, such a particular application should not be construed as limiting.

A second device 304 can include one or more applications, referred to collectively as an application 316'. Application 316', like 116 of FIG. 1, can derive future channel information from packets received from first device 302. However, application 316' can also determine the event count for a future window (a target window) in which a target packet will be transmitted. Such an event count can be included in a packet (a "notice" packet) that is transmitted to the first device 302. Application 316' can also generate a special payload for the target packet that can be used by a first device 302.

Referring still to FIG. 3, an operation according to an embodiment will now be described.

In window 306-0, first device 302 can transmit a packet 312-0 that includes future channel information, as in the case of FIG. 1. Second device 304 can receive the future channel information to enable it to properly transmit a packet in a subsequent (in this case next) window 306-1.

In window 306-1, application 316' of second device 304 can operate to insert an event count (6) corresponding to a future target window (322) into the payload of a packet 320. The packet can then be transmitted as a notice packet 320. First device 302 can receive notice packet 320, extract the event count to establish when a target packet will be received. As in the case of FIG. 1, first device 302 can transmit future channel information (5) in a packet for use by second device 304.

It is noted that alternate embodiments may not include a notice packet as described herein, with target packets being transmitted according to some predetermined order (every window, every even or odd window, etc.).

Referring still to FIG. 3, window 322, which has event count EC6, is the target window indicated by notice packet 320. In target window 322, second device 304 can transmit a target packet 324 having a special payload 326 for first device 302. Application 318 can process the data of, or signals generated by the transmission of, the special payload 326. The process can continue, with first device 302 transmitting packets with future (e.g., next) channel information.

In some embodiments, a device can include a built-in "whitening" process for transmitting packet data. That is, packet data which takes the form of a series of binary values, can have values (e.g., 1s or 0s) that are pseudorandomly inverted to reduce the autocorrelation of the resulting signal generated by transmission of the packet. A receiving device is understood to have a corresponding "de-whitening" process which can remove the additional values to arrive at the original packet data.

According to embodiments, a device can utilize a whitening process to generate a desired signal. That is, packet payload values can be subject to an "inverse" whitening process such that, when the packet is whitened, the transmitted signal and/or data have a desired value. A particular example of an inverse whitening process will be described with reference to FIG. 4.

Figure 4:
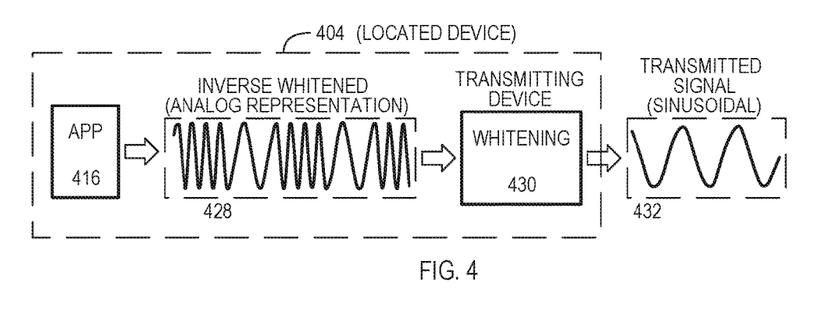
FIG. 4 is a diagram illustrating inverse whitening operations that can be included in embodiments.

FIG. 4 is a diagram showing an inverse whitening process that can be included in embodiments. FIG. 4 shows a device 404 that includes an application 416 and a whitening process 430. In particular embodiments, a device 404 can be a second device that serves as a located device in a direction finding operation.

Application 416 can generate an "inverse-whitened" packet payload value 428 that, when put through the whitening process 430, can generate a substantially sinusoidal signal. It is understood that packet payload value 428 is a digital value and is shown in FIG. 4 in an analog (FSK) form (i.e. the packet would appear when transmitted absent any whitening). Whitening process 430 can be any suitable whitening process and can be "built-in" to device 404 (e.g., part of the hardware, firmware or both). When inverse-whitened packet payload value is whitened with whitening process 430 and then transmitted, the payload portion of the resulting signal can be a sinusoidal signal. Such a signal can be used by a receiving device (i.e., locating device) in a direction finding operation. A substantially sinusoidal signal can be a signal with sufficient periodicity to enable direction finding hardware to derive a direction for a device 404.

In some embodiments, packet payload value 428 can be the payload for a target packet transmitted in a target window, to thereby generate a substantially sinusoidal signal for another device at a known time. It is noted that, absent the teachings disclosed herein, a built-in whitening process would prevent the generation of a desired direction finding packet. In a direction finding application, a device (i.e., first or locating device) can include an array of antennas. Phase differences in a signal wave front hitting the antenna array can be calculated. Such phase differences can be used to determine the direction of the transmitting (i.e., second or located) device. A whitening process adds uncertainty/unpredictability due to the modulation changing the predictability of the phase. According to embodiments, an inverse whitening process can eliminate or greatly reduce the adverse effects of whitening when trying to generate a periodic signal.

As noted herein, an application installed on a second device can implement inverse whitening on a packet. In some protocols, whitening can vary according to a transmission window (e.g., channel). Accordingly, an application on a second device (e.g., 116, 31) can utilize information received from a first device regarding a future window to implement the appropriate inverse whitening for such a window. In a very particular embodiment, a second device can be a BT/BLE device, which can use a channel ID value to select an appropriate inverse whitening process (e.g., inverse whitening seed).

It is understood that while FIG. 4 shows an embodiment that can generate a substantially sinusoidal signal, it is understood various other signal types could be generated with the appropriate inverse-whitened data. As but one of numerous examples, a resulting signal generated by whitening could be a modulated signal, where the modulation is different than that used in the controlling protocol (e.g., the system could be using FSK, but the resulting signal could have a different kind of frequency modulation).

It is also understood that while FIG. 4 shows the generation of a particular analog signal by accounting for whitening, other embodiments could use whitening to generate a desired digital value.

Figure 5:
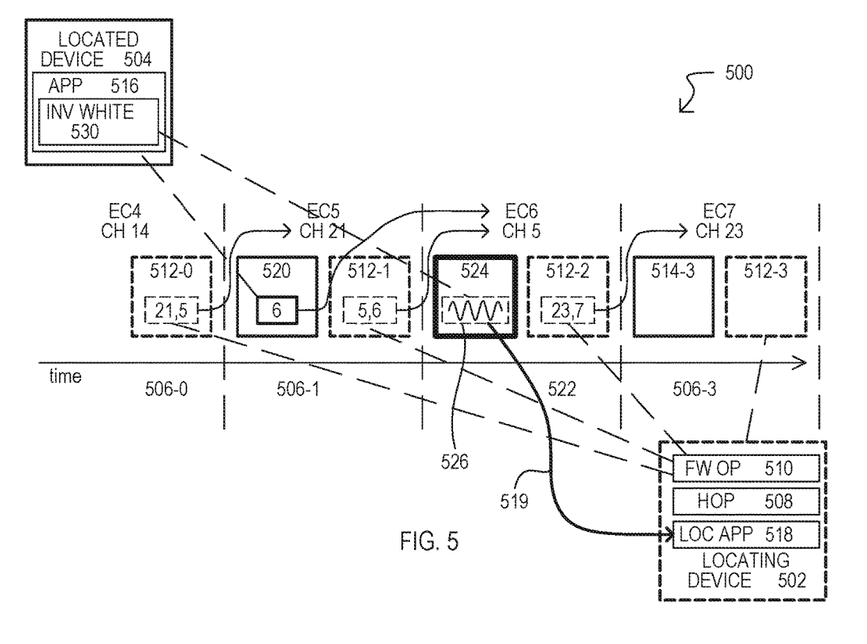
FIG. 5 is a signaling diagram of a system that provides direction finding according to an embodiment.

FIG. 5 is a signaling diagram showing a direction finding system 500 according to an embodiment. A system 500 can include items like those of FIG. 3, and such items can be subject to the same variations as, or be equivalents to, such like items of other embodiments. System 500 can be a system in which a first device 502 can be locating device and a second device 504 can be a located device.

An operation according to an embodiment will now be described with reference to FIG. 5.

In window 506-0, first device 502 can transmit a packet 512-0 that includes future channel information, as in the case of FIG. 1. Second device 504 can receive the future channel information to enable it to properly transmit a packet in a subsequent (in this case next) window 506-1.

In window 506-1, application 516 installed on second device 504 can generate a notice packet 520 as described herein, or an equivalent, which can be received by first device 502.

In target window 522, by operation of application 516, second device 504 can transmit target packet 524 having a payload generated by an inverse whitening operation 530 of application 516. By operation of automatic whitening circuits within second device 504, as the target packet 524 is transmitted, the transmission of the special payload 526 can generate a substantially sinusoidal signal 519. First device 502 can use substantially sinusoidal signal 519 in a locating (e.g., direction finding) application 518. As but one of many possible examples, first device 502 may receive substantially sinusoidal signal 519 at one antenna and then another antenna and utilize phase differences between the received signals to generate direction finding values.

As noted elsewhere herein, other embodiments may not include the generation and transmission of a notice packet. Rather, target packets can be generated in some predetermined fashion once channel information is known.

While FIG. 5 describes a system in which a second device 504 can generate inverse whitened packet data 526, in alternate embodiments such data can be generated by a first device 502. A first device 502 can transmit such data to second device 504, and second device 504 can return such data in a target packet as described herein.

Figure 6A:
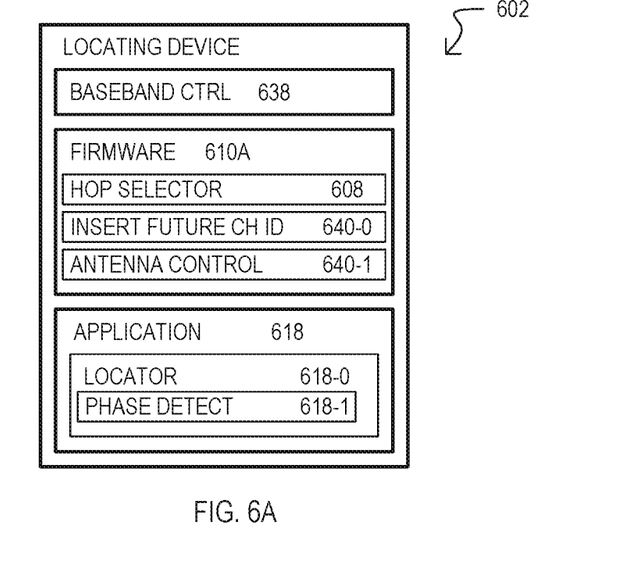
FIGS. 6A and 6B are block diagrams of devices according to embodiments.
Figure 6B:
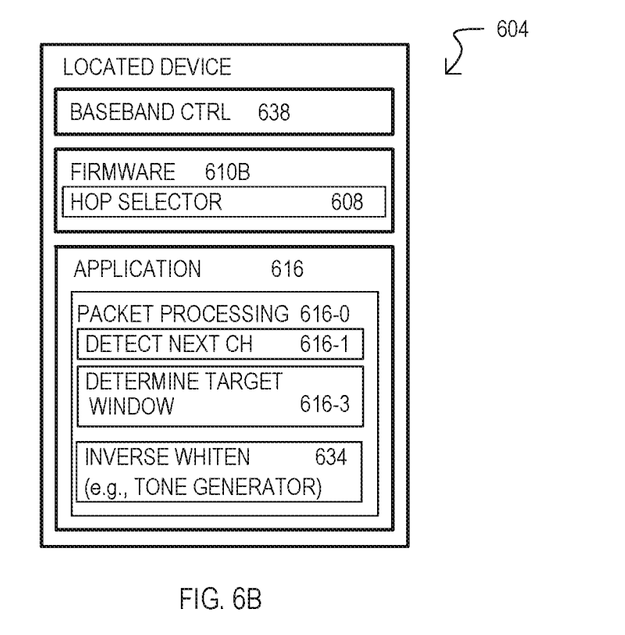

Referring to FIGS. 6A and 6B, devices according to embodiments are shown in block diagrams. FIG. 6A is a block diagram of a first device 602 according to an embodiment. A first device 602 can be a device that transmits future hop/channel/window information so that a second device can properly time its packets to communicate with the first device. A first device 602 can also provide particular processing of a target packet issued from the second device. In the particular embodiment shown, a first device 602 can be a locating device that can process a substantially sinusoidal signal generated by a target packet transmitted from a second device.

A first device 602 can include a baseband controller 638, firmware 610A, and one or more applications 618. A baseband controller 638 can control hardware for transmitting and receiving wireless signals. In some embodiments, baseband controller 638 can control radio frequency (RF) hardware. In some embodiments, baseband controller can be a BT/BLE compatible baseband controller. In particular embodiments a baseband controller compatible with a BT/BLE standard.

Firmware 610A can include data and instruction programmed into the device. Firmware 610A can be stored/programmed into nonvolatile memory on the device and require some security protocol to change. Firmware 610A can include instructions executable by a processor (not shown) of the device 602 as well as register settings and the like for configuring the device 602. In the embodiment shown, firmware 610A can include a hop selector 608, future channel insertion function 640-0, and antenna control 640-1. A hop selector 608 can determine a sequence of channels and can take the form of any of those described herein, or equivalents. A future channel insertion function 640-0 can insert future channel information into the payloads of packets at predetermined locations and/or in a predetermined fashion. Such operations can take the form of any of those described herein, or equivalents. Antenna control 640-1 can enable data to be acquired for a signal (e.g., the sinusoidal signal) to be received at two antennas for direction finding purposes.

Applications 618 can include a locator (e.g., direction finding) application 618-0. In the embodiment shown, the locator application 618-0 can include a phase detection operation 618-1. A phase detection operation 618-1 can detect a difference in phase between a substantially sinusoidal signal received at two different antennas.

It is noted that, depending upon the hardware of device 602, some functions noted as being functions/operations of firmware 610A could be executed by an application 618 and vice versa. However, it is understood that in the embodiment shown, the device 602 can be configured into a locating device with changes only to firmware and possible, the addition of an application. Thus, an existing device 602 can be easily converted to provide new functions described herein. In particular embodiments, first device 602 can be a BT/BLE device modified to provide any of the various functions described herein, without changes to hardware.

Referring to FIG. 6B, a second device 604 can include application 616 that can derive future hop/channel/window information from the first device to communicate with the first device. An application can also send a target packet that can be the subject of special processing by the first device. Optionally, a second device 604 can also send a notice packet as described herein, or an equivalent. In the particular embodiment shown, a second device 604 can be a located device that can issue a substantially sinusoidal signal by transmission of the target packet, which can then be used for direction finding by other devices.

A second device 604 can include a baseband controller 638, firmware 610B, and one or more applications 616. A baseband controller 638 and firmware can have the same functions as first device 604, including a hop selector 608. However, application 616 does not receive hop information from a hop selector 608.

Unlike the first device 602, firmware 610B of the second device 604 does not include any specialized functions. In some embodiments, baseband controller 683 and firmware 610B can follow a BT/BLE standard.

Applications 618 can include a detect next channel function 616-1, determine target window function 616-2, and an inverse whiten function 634. A detect next channel function 616-1 can examine received packet data and determine if the packet signals a future (e.g., next) channel in a hop sequence, where the application 618 does not know the hop sequence. A determine target window function 616-2 can determine when a target packet will be transmitted, based on a sequence information (e.g., event count) already known. In some embodiments, a determine target window function 616-2 can also insert a target window location (e.g., future event count) into the payload of a notice packet at predetermined locations and/or in a predetermined fashion. Such operations can take the form of any of those described herein, or equivalents.

An inverse whiten function 634 can modify data for transmission to account for a whitening process inherent in the device 604. In the particular embodiment shown, an inverse whiten function 634 can modify packet payload data so that it generates a substantially sinusoidal signal when transmitted. In a very particular embodiment, a second device 604 can use FSK, and an inverse whiten function can ensure that after whitening, the payload is all ones (and hence transmit a continuous tone of the base frequency plus an offset) or all zeros (and hence transmit a continuous tone of the base frequency minus an offset). As noted herein, in some embodiments, a protocol can dictate that whitening varies between windows (e.g., channels), and an application 616 can use channel information from a first device to determine the kind of inverse whitening needed for an upcoming window.

It is noted that in the embodiment shown, the second device 604 can be configured into a located device by addition of an application only. Thus, an existing device can be easily converted to provide new functions described herein. In particular embodiments, second device 604 can be a BT/BLE device modified to provide any of the various functions described herein, without changes to hardware or firmware.

Figure 7:
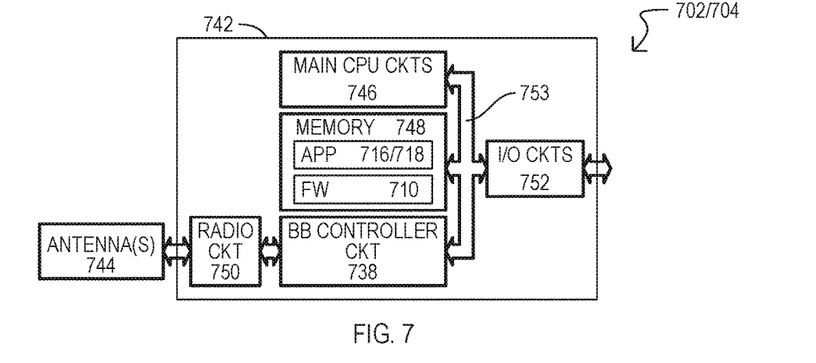
FIG. 7 is block circuit diagram of a device according to an embodiment.

Referring now to FIG. 7, a device 702/704 according to embodiments is shown in circuit block diagram. A device 702/704 can be a first or second device as described in various embodiments herein, and equivalents.

A device 702/704 can include processor circuits 746, a memory system 748, a baseband controller 738, a radio circuit 750, I/O circuits 752, and one or more antennas 744. Processor circuits 746 can include one or more processors that can execute instructions stored in memory system 748, including instructions stored in firmware or for an application installed on the device 702/704. A memory system 748 can include memory circuits operating as firmware 710 and/or storing applications 716/718. Firmware 710 and applications 716/718 can take the form of any of those described in the embodiments shown herein, or equivalents.

A baseband controller 738 can control radio circuits 750 to enable packets to be transmitted and received. In some embodiments, baseband controller 738 and radio circuits 750 can be BT/BLE compatible circuits. Input/output circuits 752 can enable control and other signals to be input to and output from the device 702/704. In some embodiments, all but the antenna(s) 744 can be part of a same integrated circuit or integrated circuit package 742.

Antenna(s) 744 can include one or more antennas. In some embodiments, a device 702/704 can be a locating device and can include at least two antennas to enable the detection of phase differences between a signal received at two different antennas.

It is understood that FIG. 7 shows but one particular arrangement, and devices as described herein can take various other forms.

While various methods are understood from the embodiments described herein, additional methods will now be described with reference to a number of flow diagrams.

Figure 8A:
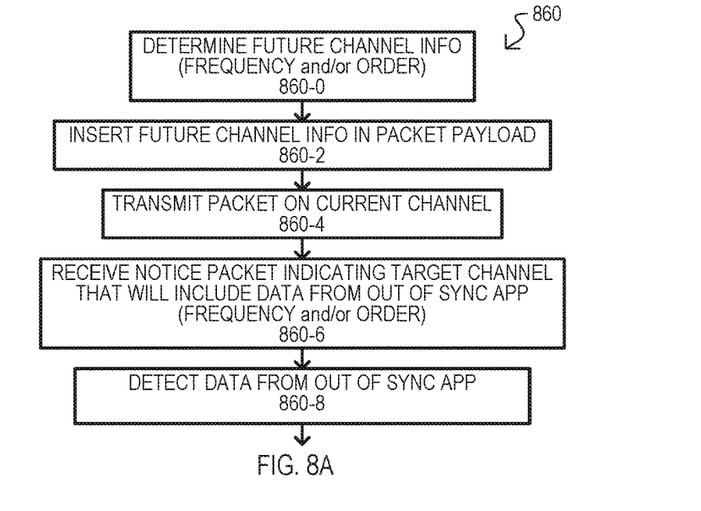
FIGS. 8A and 8B are flow diagrams of methods according to embodiments.

FIG. 8A shows a method 860 according to one embodiment, where a device operating according to a channel hopping sequence can receive data or a signal from another device. A method 860 can include determining future channel information 860-0. Such an action can include a device operating a hop sequencer that can generate different base transmission frequencies, as well as indicate a sequential order in which such base frequencies will be used. In some embodiments this can include a pseudorandom generator.

A method 860 can include inserting future channel information into a packet payload 860-2. Such an action can include but is not limited to: inserting the future channel information at a particular location in a payload or inserting the future channel information into a payload with information marking it as channel information. The packet containing the future channel information can then be transmitted on a current channel 860-4. In some embodiments, the future channel information can be for the very next channel following that in which the packet containing the future channel information is transmitted.

A method 860 can further include receiving a notice packet indicating a target channel 860-6. Such a notice packet can designate an upcoming channel as the target channel with order data (e.g., event count) and/or base frequency data. The target channel is understood to include data from an "out of sync" application. An out of sync application can be an application installed on a device that is unaware of a protocol sequence, and so has to derive channels from packet data sent.

Data from the out of sync application can then be detected in the target channel 860-8. It is noted that while detected data can be digital data generated by demodulating a signal received in the target channel, it can also include one or more analog signals transmitted in the target channel.

Figure 8B:
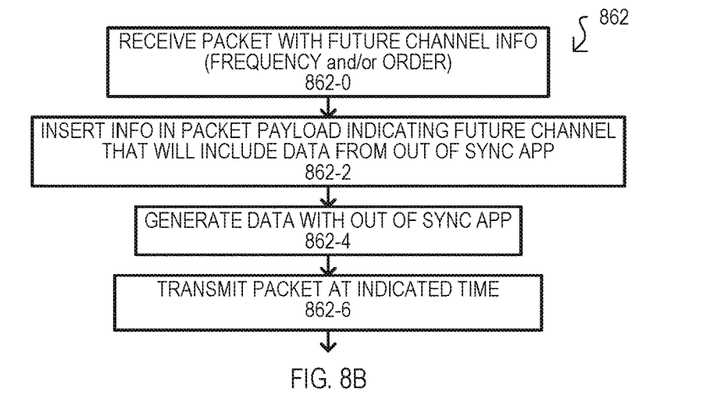

FIG. 8B shows a method 862 according to another embodiment, where an application can communicate with another device operating according to a channel hopping sequence without knowing the channel hopping sequence. A method 860 can include receiving a packet with future channel information 862-0. Such an action can include receiving a packet and examining a payload of the packet to see if it includes future channel information. Such an action can include but is not limited to: examining a particular location in a payload or examining the payload for information marking payload data as including future channel information.

A method 862 can include inserting information indicating a future channel that will include data from the out of sync application 862-2. Such an action can include but is not limited to: inserting such information at a particular location in a payload or inserting such information with other information marking it as channel information. In some embodiments, such action can include transmitting a notice packet as described herein, or equivalents. In some embodiments, such an action can include transmitting an event count as described herein. An out of sync application can be an application that does not know the channel hopping sequence used by the receiving device.

A method 862 can further include transmitting the data from the out of sync application at an indicated time 862-6. Such an action can include transmitting of data on the future channel indicating in 862-2. In some embodiments, the data can be included in the payload of a packet. In particular embodiments, such data can be one or more signals generated by the transmission of a target packet.

Figure 9:
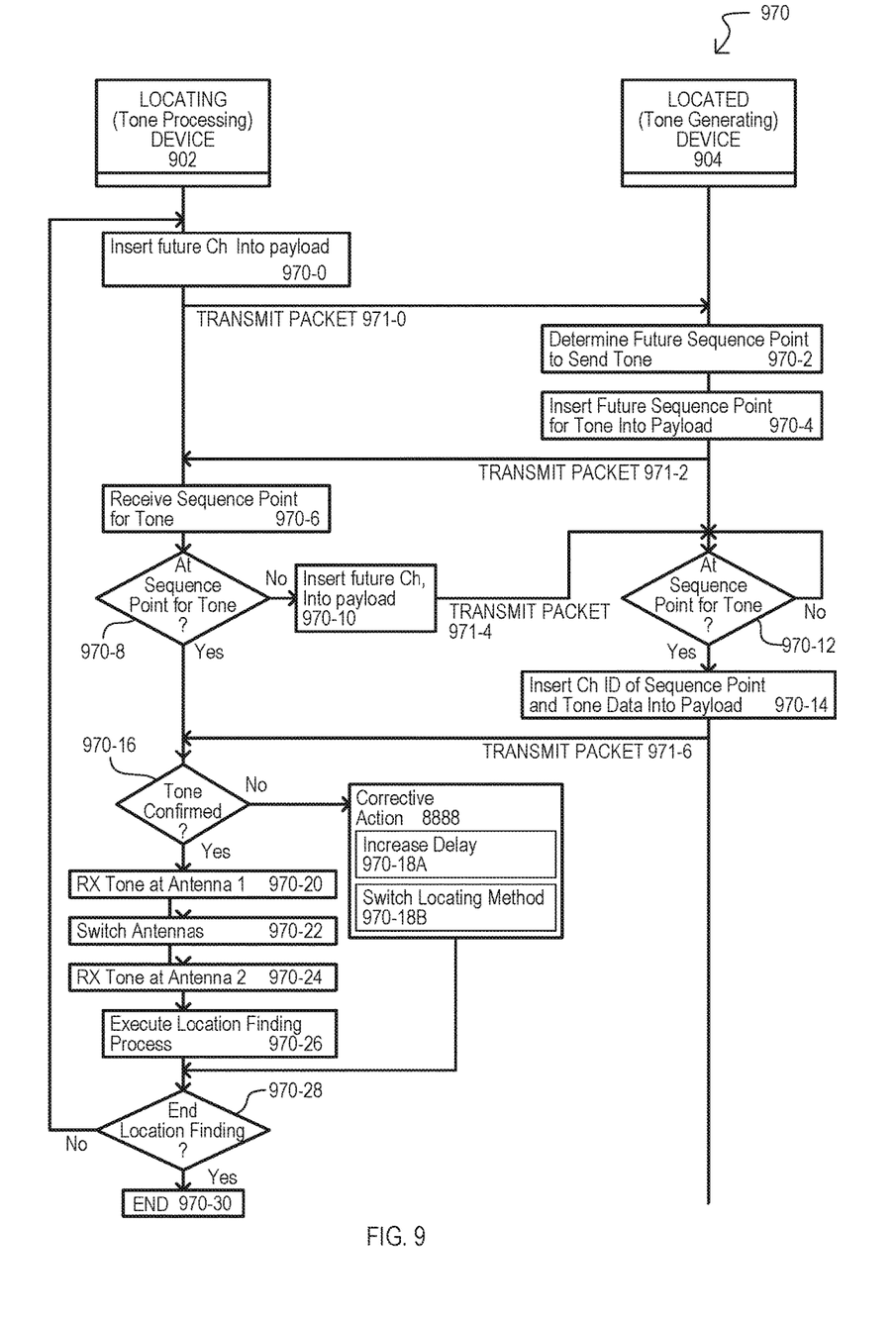
FIG. 9 is a signaling diagram showing methods/protocols according to embodiments.

Referring now to FIG. 9, a method 970 according to a further embodiment is shown in a signaling diagram. A method 970 can be a direction finding method where a locating device 902 can generate direction finding results to find another device (i.e., "located" device) 904. The locating device 902 can operate according to a channel hopping sequence not known to an application installed on the located device 904. In some embodiments, locating device 902 and located device 904 can be BT/BLE compatible devices, communicating via a BT/BLE protocol.

A method 970 can include the locating device inserting future channel information into a payload of a packet 970-0. Such a packet can then be transmitted 971-0. The packet transmitted 971-0 can be received by the located device. From such information, an application on the located device can determine a future sequence point in which it will transmit a tone 970-2. A "tone" can be a substantially sinusoidal signal of relatively long duration that can be used by a locating device 902 to generate direction finding results.

An application on located device 904 can insert the determined future sequence point for the tone into a payload of a packet 970-4. Such a packet can then be transmitted 971-2. From such a packet, a locating device 902 can receive, and thus determine the sequence point in which the tone will be transmitted 970-6.

A locating device 902 can determine if it has reached the sequence point for the tone 970-8. If the sequence point has not been reached (No from 970-8), the locating device can continue to insert future channel information into packets 970-10 and transmit such packets 971-4.

After located device 904 has transmitted its packet at 971-2, its application can determine if it has reached the sequence point for the tone 970-12. If the sequence point has not been reached (No from 970-12), the located device can continue to wait. If the sequence point has been reached (Yes from 970-12), the application on the located device can insert a channel identification and tone data into a packet payload 970-14. Such a packet can then be transmitted 971-6. When the packet is transmitted 971-6, it can generate the tone.

In some embodiments, a "tone" including payload can be include both "tone" data and additional data. Additional data can come first in the payload and contain information that can be used to double check the inverse whitening sequence (e.g., channel ID, or other data). Following the additional data can be tone data. For example, a CRC could be included in addition to the channel ID. It is understood that in such an arrangement, both devices (902/904) can be knowledgeable about the size of the additional data, so that they know exactly where the "tone" would sit in the payload.

A locating device 902 can receive the packet with the tone data and confirm the tone (i.e., check with the additional data transmitted with the tone) 970-16. Such an action can ensure tone processing is performed at a desired frequency. If a tone is confirmed (Yes from 970-16), a locating device can receive the tone at one antenna 970-20, switch antennas 970-22, and then receive the tone at a second antenna 970-24 (and even more antennas). Locating device can then execute a direction finding operation 970-26. In some embodiments, such an action can include using angle-of-arrival (AoA) of such signals to generate direction finding data.

If a tone is not confirmed (No from 970-16), a locating device can take some corrective action 970-18. A corrective action can include, but is not limited to, the locating device 902 increasing a delay between channels (e.g., transmission windows), or switching to a different locating method (e.g., received signal strength indication, RSSI).

A method 970 can include determining if the direction finding operation is over 970-28. If direction finding is determined to not end (No from 970-28), a method 970 can return to 970-0. If direction finding is determined to end (Yes from 970-28), a method 970 can end 970-30.

While embodiments can include various systems and methods for communicating information between devices, where an application installed on a device does not know a hop sequence, other embodiments can include calibration methods for such systems. Examples of such calibration systems and methods will now be described.

Figure 10A:
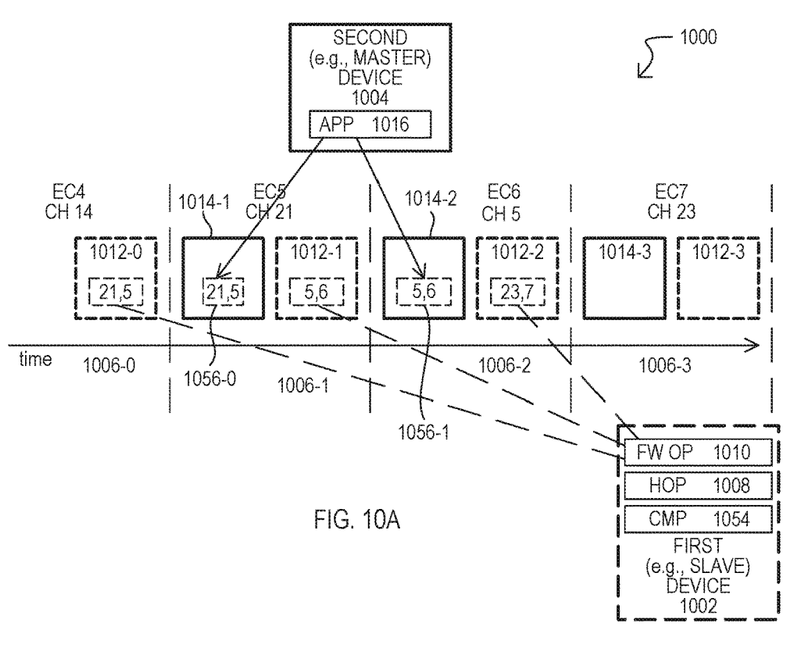
FIGS. 10A and 10B are signaling diagrams showing calibration methods according to embodiments.

FIG. 10A is a signaling diagram showing calibration of a system 1000 according to an embodiment. A system 1000 can include items like those of FIG. 5, and such items can be subject to the same variations as, or be equivalents to, the like items in other embodiments.

In system 1000, a first device 1002 can include a compare operation 1054 that can compare received channel and count values to expected channel and count values, and thus confirm the system is calibrated. A first device application 1016 can insert a channel value and sequence data (e.g., event counter) for a window, and transmit the packet in the window.

A calibration operation will now be described.

In window 1006-0, first device 1002 can transmit a packet 1012-0 that includes information for a future window. In the embodiment shown, such future window information includes a future channel information and corresponding future sequence information (e.g., event count) (shown as 21 for the channel, 5 for the sequence). Second device 1004 can extract such information from received packet 1012-0.

In window 1006-1, by operation of application 1016, second device 1014 can insert the received channel/sequence data 1056-0 into a packet 1014-1 and transmit such a packet 1014-1 in what the application believes is the correct window. First device 1002 can receive the packet 1014-1 and compare application 1054 can confirm it has the proper information 1056-0, thereby confirming the devices 1002 and 1004 are calibrated.

The process can continue with the first device 1002 inserting future window information into packets (e.g., 1012-1, 1012-2) and second device application 1016 returning such information (e.g., 1056-1) in packets (e.g., 1014-2).

In the embodiment shown in FIG. 10A, future window information can be for the next window in the sequence, however, alternate embodiments can include future window information being for a window even further in the sequence.

Figure 10B:
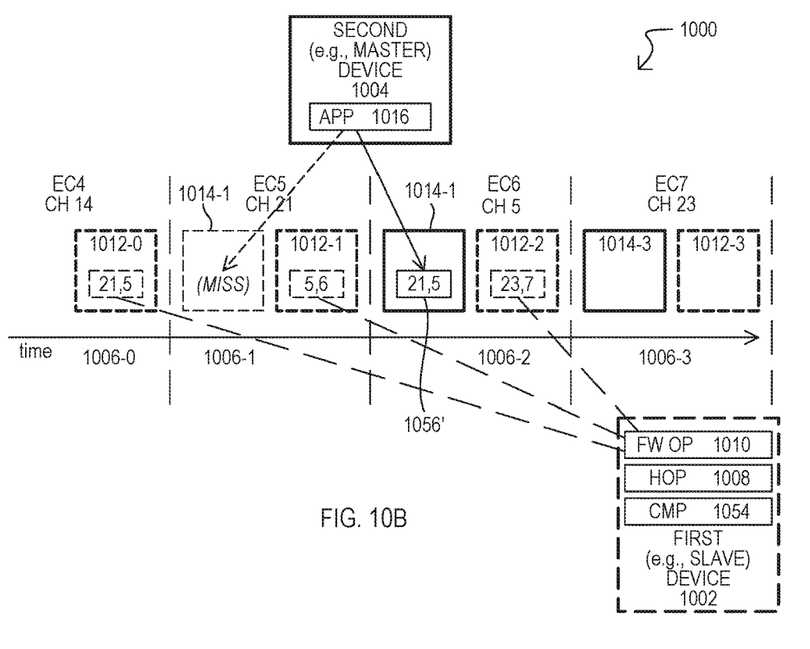

FIG. 10B shows one example of a calibration failure for a system 1000 like that shown in FIG. 10A. In the example of FIG. 10B, a second device application 1016 may not have sufficient time to determine the future window and/or insert the confirming information (e.g., 1056') for a packet to be transmitted in the proper window. As a result, packet 1014-1 can be transmitted in the wrong window (1006-2 instead of 1006-1). In some embodiments, first device 1002 can use a compare operation 1054 to confirm the system 1000 is out of calibration.

In some embodiments, corrective action can be taken in response to a calibration failure. As but one of many possible examples, corrective action can include increasing window size and/or the time between windows.

Figure 11:
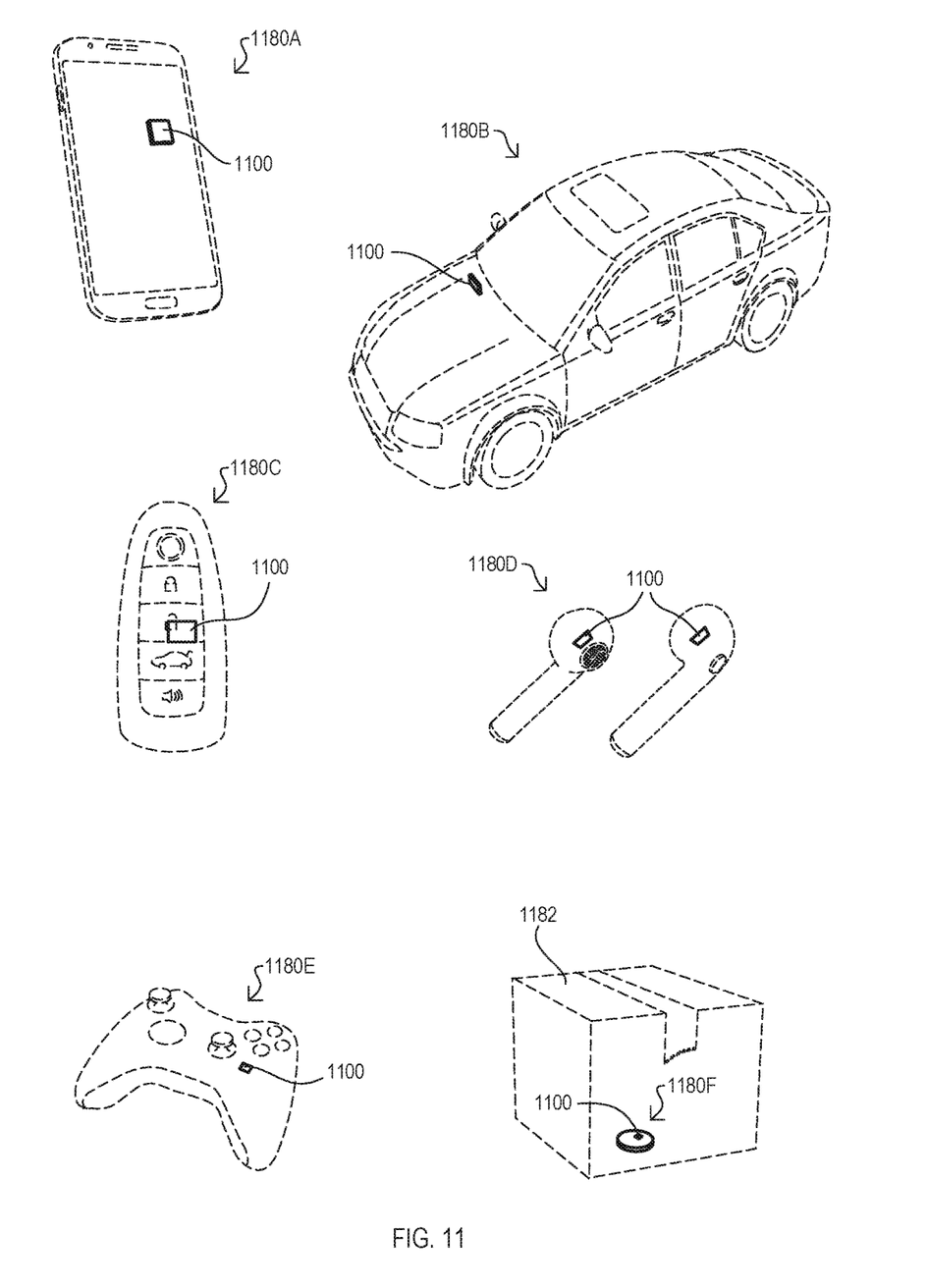
FIG. 11 is a collection of diagrams showing various devices according to embodiments.

Referring to FIG. 11, various devices according to embodiments are shown in series of diagrams. FIG. 11 shows a "smartphone" device 1180A, an automobile 1180B, an automobile key 1180C, wireless headphones 1180D, a gaming controller device 1180E, and a package locating device 1180F. A package locating device 1180F can be device included in, or otherwise attached to, a package 1182. All such devices 1180A to 1180F can include one or more integrated circuit devices 1100, such as that shown in FIG. 7, as but one of many possible examples.

The devices (1180A to 1180F) can include an application (e.g., 116, 316, 516, 616, 1016) to enable such devices to perform any of the functions of a second device of the embodiments shown herein, or equivalents, including serving as a located device (i.e., a device that emits a finding signal). In addition or alternatively, the devices (1180A to 1180F) can have updated firmware (e.g., 110, 310, 510, 610A, 1010) and be loaded with an application (e.g., 318, 518, 618, 1054) to enable such devices to perform any of the functions of first devices of the embodiments shown herein, or equivalents, including serving as a locating device (i.e., a device that processes a finding signal emitted by another device).

Such capabilities may not require changes to hardware and thus can be easily implemented. In particular embodiments, devices (1180A to 1180F) can BT/BLE devices compatible with a BT/BLE specification, which can receive updates to firmware and applications to enable direction finding.

It is understood that the various devices shown in FIG. 11 are provided by way of example only and should not be construed as limiting to the invention. Various other devices and systems would be readily understood by those skilled in the art.

FIGS. 12A to 12E are a sequence of diagrams showing a device 1204, corresponding application 1216 and example operations for the same. A device 1204 can be a "second" device according to any of the embodiments disclosed herein or equivalents. A device 1204 can include processing circuits for executing an application 1216. While FIGS. 12A to 12E show a device 1204 in the form of the smartphone, a device can various other forms.

Figure 12A:
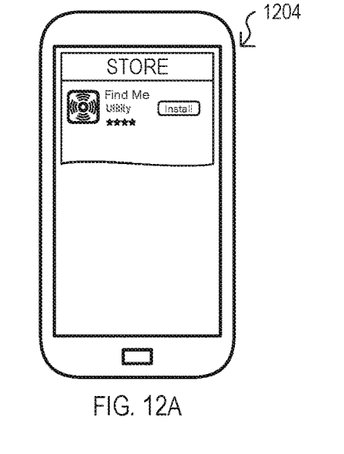
FIGS. 12A to 12E are a series of diagrams showing an application and related operations according to an embodiment.

Referring to FIG. 12A, an application 1216 can be installed on, and run by device 1204 without requiring changes in hardware and/or firmware. In the embodiment shown, an application 1216 can be available for installation on device 1204 at a "store" or other platform. In this way, the application 1216 can be readily available to a consumer. However, in other embodiments application 1216 may be pre-installed on device 1204 (installed by a manufacturer or service provider).

Figure 12B:
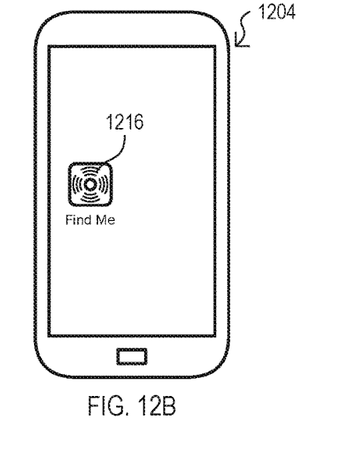

Referring to FIG. 12B, once application 1216 is installed on device 1204, it can be activated. Activation can take any suitable form, and in the embodiment shown, can include "clicking" an icon for the application 1216.

Figure 12C:
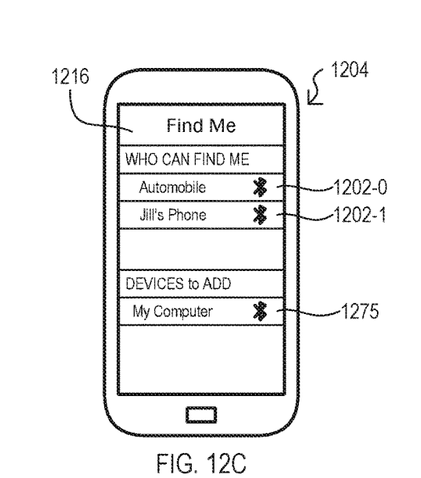

FIG. 12C shows how device 1204 can be included in a system having other devices. In the embodiment shown, device 1204 can be a "located" device that is associated with "locating" devices 1202-0/1. In some embodiments, located and locating devices can be associated with one another according to a protocol. In the example shown, devices can be "paired" according to a BT/BLE protocol, however this should not be construed as limiting. Embodiments anticipate any suitable methods for associating devices with one another according to any suitable protocol. FIG. 12C shows how additional devices 1275 can be added to a system. It is understood that devices 1202-0/1 and 1275 have direction finding capabilities that can operate from predetermined (e.g., substantially sinusoidal) signals issued from device 1204.

Figure 12D:
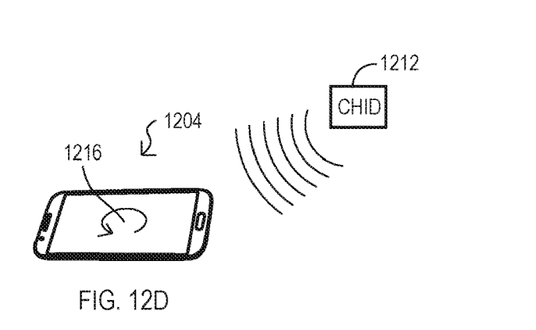
Figure 12E:
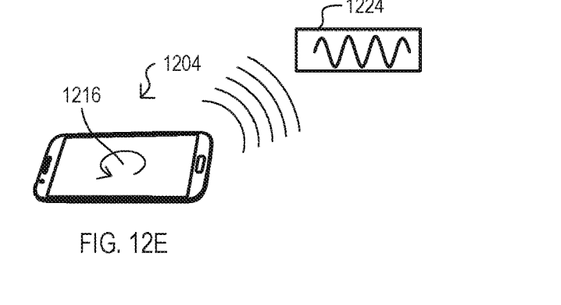

FIGS. 12D and 12E show one example of a locating operation. A device 1204 (which can be a located device) can have an application 1216 running thereon. As a result, device 1204 can be configured to sense (or to periodically sense) packets 1212 issued from a locating device. Such packets can identify a window in which application 1215 can communicate with a locating device.

In some embodiments, a device 1204 may have access to sequence data (e.g., event counter) and/or can issue a notice packet as described herein or equivalents.

Application 1216 can then generate payload for a target packet 1224, and device 1204 can transmit a target packet 1224. Optionally, application can transmit a notice packet prior to a target packet, as described herein or an equivalent. The transmission of target packet 1224 can generate a substantially sinusoidal signal which can be used by other devices to find device 1204.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of a first device, generating sequence information for a plurality of sequential transmission windows, the sequence information including at least a channel identification (ID) corresponding to a base frequency for each window;
by operation of the first device, generating payload data for a packet and wirelessly transmitting the packet in a first window, the payload data including sequence information for a notice window later in the sequence than the first window;
by operation of an application executed on a second device,
forming and transmitting a notice packet in the notice window that includes target information that indicates a future window as a target window, the target information being different than a channel ID,
composing a target packet that includes inverse whitened data, and
transmitting the target packet in the target window;
by operation of the second device, whitening the target packet, wherein the whitening of the inverse whitened data results in a substantially sinusoidal signal when the target packet is transmitted by the second device; and
by operation of the first device, determining a direction of the second device with respect to the first device by processing the substantially sinusoidal signal.

2. The method of claim 1, wherein:
the sequence information includes an event count for each window that indicates an order of each window with respect to the other windows; and
the target information includes an event count.

3. The method of claim 1, wherein generating the payload data for the packet to be transmitted in one of the windows includes firmware instructions executed by the first device.

4. The method of claim 1, wherein the sequence information for a window later in the sequence includes the channel ID for the next window in the sequence.

5. The method of claim 1, wherein the wirelessly transmitting packets includes frequency shift keying of the base frequency of the window.

6. The method of claim 5, wherein at least the second device is compatible with a Bluetooth/Bluetooth Low Energy (BT/BLE) Specification.

7. The method of claim 1, wherein determining the direction of the first device with respect to the second device includes determining phase differences between the substantially sinusoidal signal as received at different antennas.

8. A device, comprising:
a plurality of antennas;
baseband processing circuits configured to control radio circuits, and including a hop selector section configured to generate sequence information for a sequence of windows in which packets can be wireless transmitted, the sequence information for each window including at least a channel identification (ID) corresponding to the base frequency for the window; and
processor circuits configured to
transmit a first packet having payload data that includes sequence information for a notice window later in the sequence than the first window,
receive a notice packet in the notice window,
from target information contained in the notice packet, determine a target window in which a target packet will be transmitted, the target information being different from a channel ID, and
generate direction finding results for a to-be-located device in response to a substantially sinusoidal signal generated by the to-be-located device received in the target window.

9. The device of claim 8, wherein:
the processor circuits are further configured to generate an event count for each window;
the sequence information further includes an event count; and
the target information includes an event count.

10. The device of claim 8, wherein the processor circuits are configured to execute firmware instructions to transmit packets having payload data that includes sequence information for the notice window.

11. The device of claim 8, wherein the sequence information for the window later in the sequence includes a channel ID for the next window in the sequence.

12. The device of claim 8, wherein the processing circuits are further configured to receive the target packet from the to-be-located device, the target packet having a payload that generates the substantially sinusoidal signal when transmitted from the to-be-located device.

13. The device of claim 12, wherein:
the target packet includes an information portion and a signal portion; and
the processing circuits are further configured to confirm a frequency of the substantially sinusoidal signal from the information portion of the target packet.

14. The device of claim 8, wherein the device is compatible with a Bluetooth/Bluetooth Low Energy (BT/BLE) Specification.

15. A device, comprising:
at least one antenna;
processing circuits configured to execute an application, the application configured to
determine a base frequency of a notice window from the payload of at least one received packet, the notice window being a window in a sequence of windows,
transmit a notice packet in the notice window that identifies a target window that follows the notice window in the sequence of windows,
compose a target packet that includes inverse whitened data; and
transmit the target packet in the target window, and
baseband processing circuits configured to execute signal whitening on the target packet, wherein the whitening of the inverse whitened data results in a substantially sinusoidal signal when the target packet is transmitted by the device.

16. The device of claim 15, wherein:
the target packet includes an information portion and a signal portion,
the information portion identifying a frequency of the sinusoidal signal, and
the signal portion generating the sinusoidal signal when the target packet is transmitted.

17. The device of claim 15, wherein:
the windows include an event count that identifies the sequence of the windows and
the notice packet includes the event count for the target window.

18. The device of claim 15, wherein:
the baseband processing circuits include a hop selector section configured to generate hop sequence information for the sequence of windows; and
the hop sequence information is not available to the application.

19. The device of claim 15, wherein the device is compatible with a Bluetooth/Bluetooth Low Energy (BT/BLE) Specification.

* * * * *